(12) United States Patent
Kline et al.

(10) Patent No.: US 10,637,746 B2
(45) Date of Patent: Apr. 28, 2020

(54) DEVICE-TO-DEVICE CONNECTIVITY CONTROL

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 140 days.

(21) Appl. No.: 16/000,159

(22) Filed: Jun. 5, 2018

(65) Prior Publication Data

US 2019/0372860 A1    Dec. 5, 2019

(51) Int. Cl.
*H04L 12/24* (2006.01)
*G06K 9/00* (2006.01)
*G06T 11/20* (2006.01)
*G06F 3/0354* (2013.01)
*G06F 3/0482* (2013.01)

(52) U.S. Cl.
CPC .......... *H04L 41/22* (2013.01); *G06F 3/03545* (2013.01); *G06F 3/0482* (2013.01); *G06K 9/00087* (2013.01); *G06T 11/20* (2013.01)

(58) Field of Classification Search
None
See application file for complete search history.

(56) References Cited

U.S. PATENT DOCUMENTS

| | | | |
|---|---|---|---|
| 8,380,246 B2 | 2/2013 | Wilson | |
| 9,147,057 B2 | 9/2015 | Raffa | |
| 9,860,932 B2 | 1/2018 | Kapoor | |
| 2003/0188017 A1 | 10/2003 | Nomura | |
| 2005/0119767 A1* | 6/2005 | Kiwimagi | G05B 19/042 700/19 |
| 2006/0252442 A1* | 11/2006 | Nurmi | G06F 3/04817 455/518 |
| 2013/0339864 A1 | 12/2013 | Uusitalo | |
| 2015/0326704 A1* | 11/2015 | Ko | H04M 1/7253 455/456.3 |
| 2017/0048373 A1* | 2/2017 | Dees | H04L 12/2809 |

FOREIGN PATENT DOCUMENTS

EP    3252997 A1    12/2017

OTHER PUBLICATIONS

"Wireless connectivity for IoT applications", 2005 (see p. 4). http://www.st.com/content/ccc/resource/sales_and_marketing/promotional_material/brochure/d7/74/dc/eb/b4/f5/40/d5/brwireless_web.pdf/files/brwireless_web.pdf/jcr:content/translations/en.brwireless_web.pdf.

* cited by examiner

*Primary Examiner* — Tuan S Nguyen
(74) *Attorney, Agent, or Firm* — Cantor Colburn LLP; Tihon Poltavets

(57) ABSTRACT

A computer-implemented method includes detecting a respective position of each device of a plurality of devices. A device view is generated to indicate the respective position of each device of the plurality of devices. A graphical annotation is received on the device view, where the graphical annotation applies to at least two devices of the plurality of devices. The graphical annotation is interpreted as a connectivity request applicable to the at least two devices. The connectivity request is implemented between the at least two devices, responsive to the graphical annotation on the device view.

18 Claims, 7 Drawing Sheets

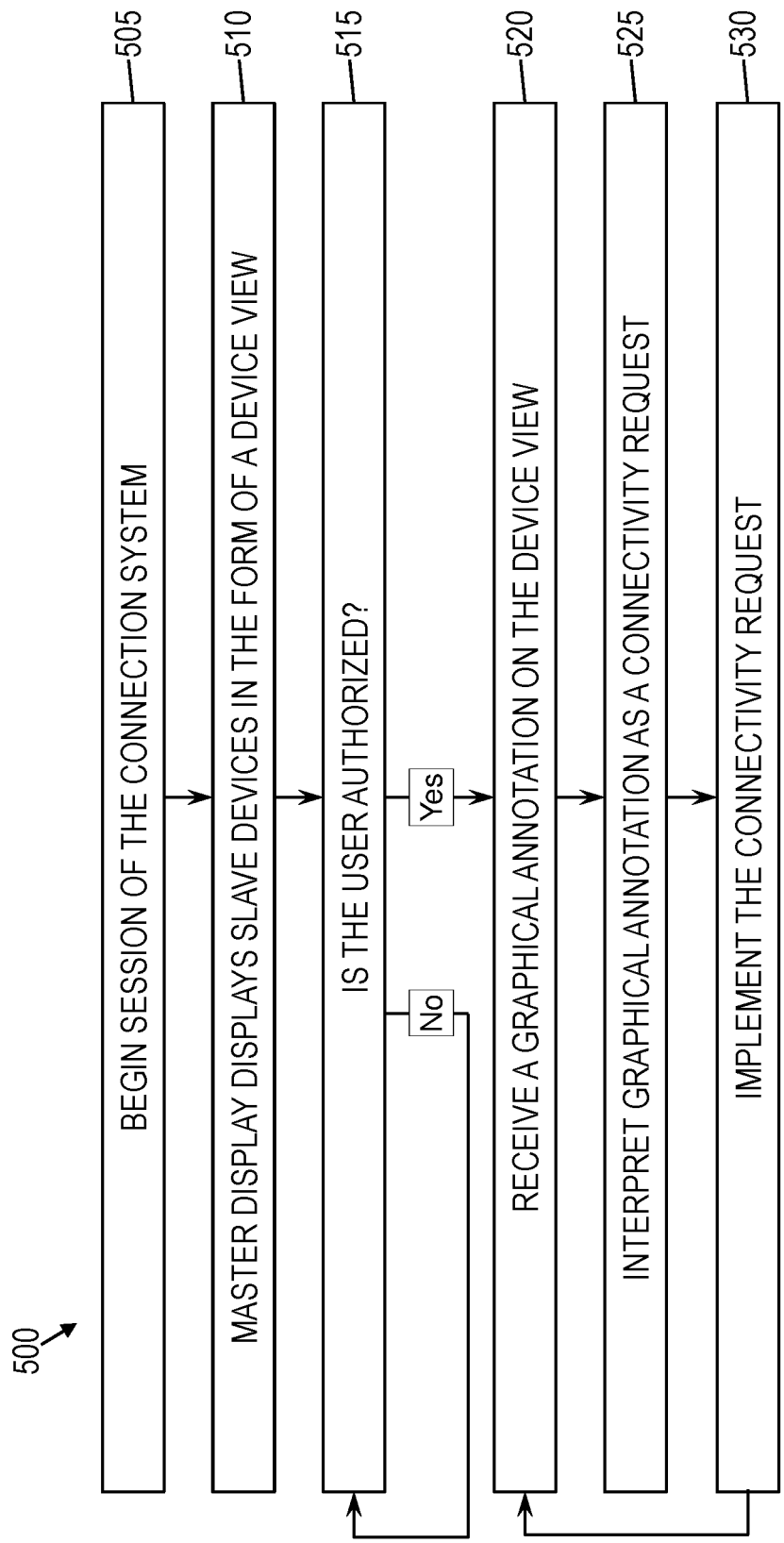

DEVICE-TO-DEVICE CONNECTIVITY CONTROL

BACKGROUND

The present invention relates to device connectivity and, more specifically, to device-to-device connectivity control.

Multi-team meetings sometimes occur, in which two or more teams to work together or negotiate their differences. These meetings can occur in person or remotely, such as through a web conference. Each team likely has a lead person as well as one or more support people. The lead is the individual who handles communications with the opposite team. The support people may communicate with the lead to provide information or make suggestions. Each member of each team likely has one or more electronic devices that may contain information relevant to the meeting. To interact within a team, as well as across teams, team members may need to share information from their devices among themselves or with the other team.

SUMMARY

Embodiments of the present invention are directed to a computer-implemented method for connecting devices. A non-limiting example of the computer-implemented method includes detecting a respective position of each device of a plurality of devices. A device view is generated to indicate the respective position of each device of the plurality of devices. A graphical annotation is received on the device view, where the graphical annotation applies to at least two devices of the plurality of devices. The graphical annotation is interpreted as a connectivity request applicable to the at least two devices. The connectivity request is implemented between the at least two devices, responsive to the graphical annotation on the device view.

Embodiments of the present invention are directed to a system for connecting devices. A non-limiting example of the system includes a memory having computer-readable instructions and one or more processors for executing the computer-readable instructions. The computer-readable instructions include detecting a respective position of each device of a plurality of devices. Further according to the computer-readable instructions, a device view is generated to indicate the respective position of each device of the plurality of devices. A graphical annotation is received on the device view, where the graphical annotation applies to at least two devices of the plurality of devices. The graphical annotation is interpreted as a connectivity request applicable to the at least two devices. The connectivity request is implemented between the at least two devices, responsive to the graphical annotation on the device view.

Embodiments of the invention are directed to a computer-program product for connecting devices, the computer-program product including a computer-readable storage medium having program instructions embodied therewith. The program instructions are executable by a processor to cause the processor to perform a method. A non-limiting example of the method includes detecting a respective position of each device of a plurality of devices. Further according to the method, a device view is generated to indicate the respective position of each device of the plurality of devices. A graphical annotation is received on the device view, where the graphical annotation applies to at least two devices of the plurality of devices. The graphical annotation is interpreted as a connectivity request applicable to the at least two devices. The connectivity request is implemented between the at least two devices, responsive to the graphical annotation on the device view.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a flow diagram of a method for controlling device-to-device connections, according to some embodiments of the invention.

Figure 1:
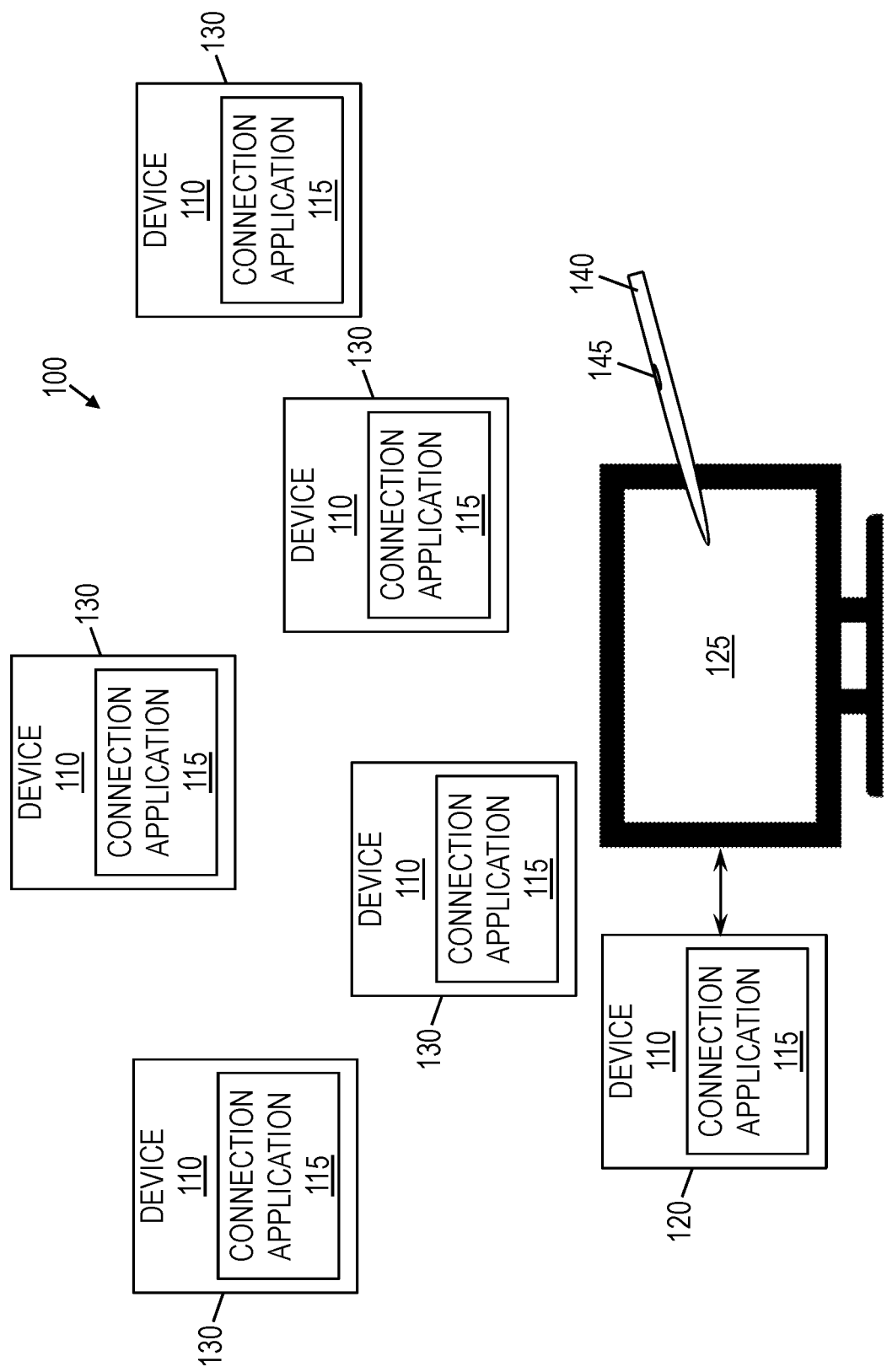
FIG. 1 is a block diagram of a connection system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, device-to-device connectivity can be performed through various technologies, such as Bluetooth, WiFi, infrared, or Light Fidelity (LiFi). When two or more devices are connected to one another, those devices can share data to perform various activities. In any multi-device ecosystem, each device in the ecosystem can potentially connect with each other device to share information or perform tasks. However, there is currently no user-friendly mechanism for controlling device inter-connectivity involving multiple devices, especially when those multiple devices are in use by various people. Conventionally, each user of each respective device would need to grant permission for that device to make a connection, which can be cumbersome in a situation where it is desirable for a lead person to be able to control device connectivity for an entire ecosystem, such as may be the case in a multi-team meeting.

Turning now to an overview of the aspects of the invention, one or more embodiments of the invention address the above-described shortcomings of the prior art by providing a mechanism to view an ecosystem of multiple devices and to control connectivity among those devices from a master device. Specifically, according to some embodiments of the invention, a master device detects nearby devices and displays them in a graphical format, showing their relative positions. A user interacting with the master device can annotate the display, such as with a finger or stylus, to indicate connectivity requests, such as desired connections, disconnections, changes, or connection rules. The master device may transmit instructions to select devices, as needed, to implement the connections, disconnections, changes, or connection rules as indicated by the user. Further, in some embodiments of the invention, when the user utilizes a stylus, the stylus is able to detect which user is interacting with the master device, to determine whether the user is authorized to make the desired connectivity requests.

The above-described aspects of the invention address the shortcomings of the prior art by enabling an authorized user at a master device to manage the connectivity of multiple devices within an ecosystem, regardless of who is using those devices. Embodiments of the invention represent an improvement over traditional connectivity control, which lies with each individual device. While traditional connectivity control is useful for an individual who is using his or her device in isolation, it becomes cumbersome when that individual wishes to dedicate the device to a team, even on a temporary basis.

Turning now to a more detailed description of aspects of the present invention, FIG. 1 is a block diagram of a connection system 100 according to some embodiments of the invention. As shown, the connection system 100 may include two or more devices 110, including a master device 120 and one or more slave devices 130. Each of the devices 110 may be an electronic device, which may include hardware or both hardware and software. For example, a device 110 may be a computer system 600, such as that illustrated in FIG. 6, which may be a smartphone, a desktop computer, a notebook computer, a tablet, or other computing device. For another example, a device 110 may be a peripheral device, such as a printer, projector, or monitor. Each device 110 may be able to connect with one or more of the other devices 110 and may be able to detect nearby devices, both of which may be performed by way of Bluetooth, WiFi, infrared, LiFi, hardwire, or other connection technology. The master device 120 may have a master display 125, which may be a display screen that is integrated into the master device 120 or externally connected. For example, and not by way of limitation, if the master device 120 is a smartphone, then the master display 125 may be a touchscreen integrated into the smartphone, and if the master device 120 is a desktop computer, then the master display 125 may be a monitor connected to the desktop computer. Additionally, a stylus 140 may be used to interact with the master display 125 and, thus, with the master device 120. Generally, the master device 120 may detect slave devices 130 and may provide instructions regarding connectivity of those slave devices 130 among one another as well as with the master device 120 itself.

Each device 110, whether a master device 120 or a slave device 130, may have a connection application 115. Specifically, an instance of the connection application 115 may be installed on each device 110. When running, the connection application 115 may enable its respective device 110 to participate in the connection system 100 by performing the tasks described in this disclosure. For example, and not by way of limitation, on a slave device 130, the connection application 115 may run in the background to accept instructions from the master device 120 and to enable and disable connections between the slave device 130 and other devices 110. For another example, on the master device 120, the connection application 115 may run in the foreground to enable a user to explicitly manage connections between the various devices 110. Additionally or alternatively to the connection application 115, a specialized hardware circuit may be installed in a device 110 to enable participation in the connection system 100.

The master device 120 may detect slave devices 130 and may display those slave devices 130 on the master display 125. More specifically, the master display 125 may show representations of the slave devices 130 graphically, in a device view, along with relative positions of the slave devices 130. In other words, the master display 125 may show a layout of the various slave devices 130 based on their arrangement relative to the master device 120 and relative to one another in real space. The master device 120 may receive, from a user, instructions related to the connectivity of the slave device 130. These instructions may be received as annotations to the device view, as will be described in more detail below.

In some embodiments of the invention, the stylus 140 may be in communication with the master device 120, specifically by way of the master display 125 as the stylus 140 may interact with the master display 125. The stylus may include a biometric reader 145, such as a fingerprint scanner. Using the biometric reader, the stylus 140 may detect whether an authorized user is utilizing the stylus to provide connectivity requests to the master device 120. If the user does not match an authorized user (i.e., if the user's biometric information does not match known biometric data of any authorized user), then the master device 120 may reject the user's connectivity requests. Analogously, if the user matches an authorized user, then the master device may accept and implement the user's connectivity requests.

In some embodiments of the invention, one or more of the devices 110 have the capability of being the master device 120. In other words, a device 110 need not be limited to always being the master device 120 or always being a slave device 130. For instance, a first device 110 may run the connection application 115 to initiate a session of the connection system 100. The first device 110, such as through the connection application 115, may then contact one or more nearby devices 110, requesting access. When access is granted by a nearby device 110, the nearby device 110 may then become a slave device 130 for the current session. Alternatively, however, a first device 110 may run the connection application 115 to initiate a session of the connection system 100 and may request to be a slave device 130 for the session. More generally, the connection application 115 may be enabled to run in master mode or in slave mode. When the connection application 115 runs in master mode on a device 110, that device 110 may behave as the master device 120. Analogously, when the connection application 115 runs in slave mode on a device 110, that device 110 may behave as a slave device 130. Although this disclosure refers to there being only a single master device 120 at a given time, it will be understood that this is for illustrative purposes only and that multiple master devices 120 may exist in a given session of the connection system 100.

Throughout this disclosure, the term "nearby" with respect to a pair of devices 110 refers to the pair of devices 110 being within a range of each other that enables connectivity. Thus, the term may be based in part on distance and may be based in part on a range of the technology being used to connect the pair of devices 110 to each other.

Figure 2:
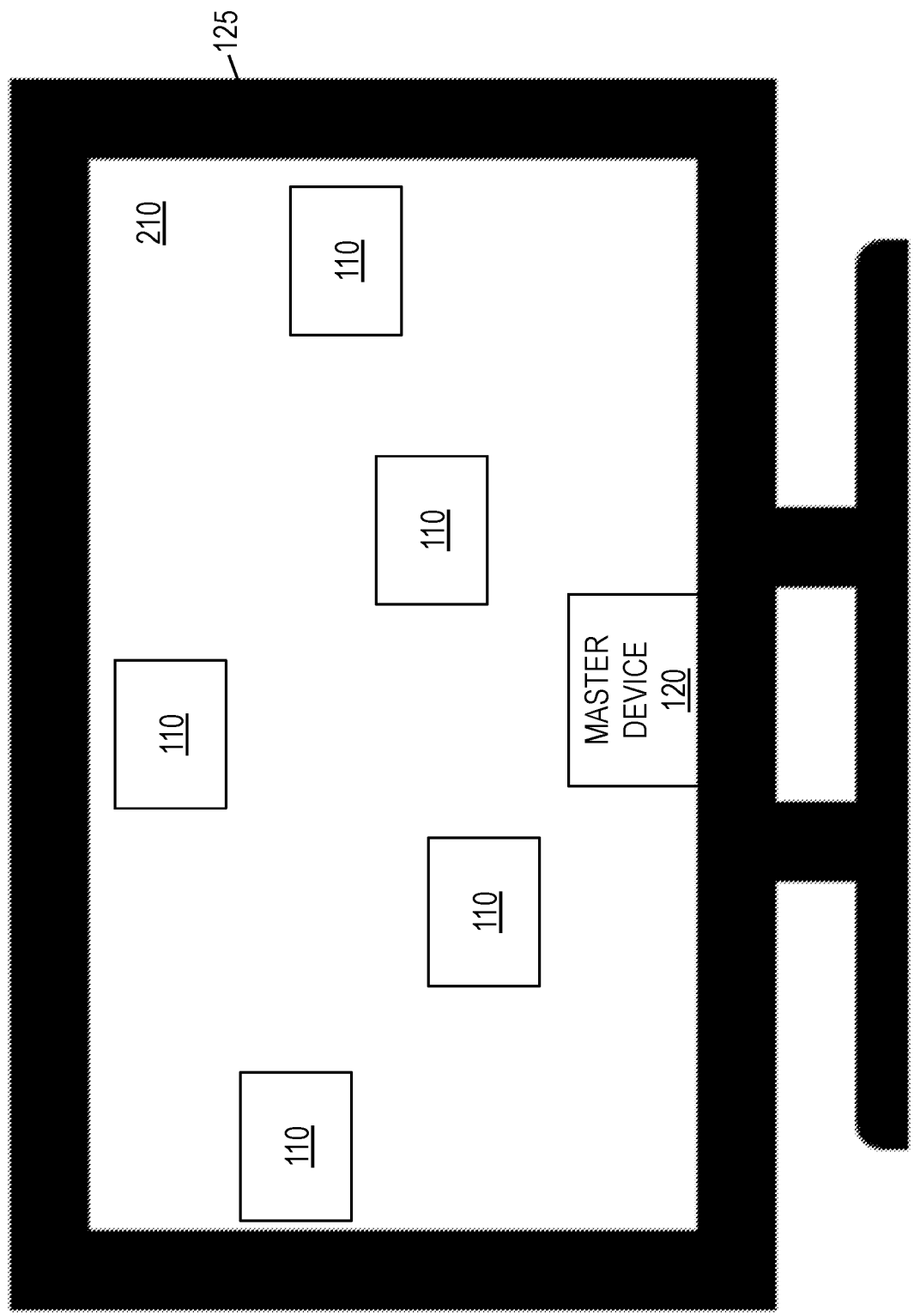
FIG. 2 illustrates a device view of the connection system, according to some embodiments of the invention.

FIG. 2 illustrates a device view 210 of the connection system 100, according to some embodiments of the invention. The device view 210 is content displayed on the master display 125 or on a display of a slave device 130. Specifically, the device view 210 may include a representation of the various devices 110 included in the current session of the connection system 100. Each device 110 may be represented by a shape, such as a rectangle, circle, or icon. As will be described below, the master device 120 may generate the device view 210 for display on the master display 125 based on detected positions of the slave devices 130, where the detected positions may be relative to the master device 120. However, it will be understood that a slave device 130 may similarly generate a device view 210 from its perspective, which may be based on positions of the master device 120 and other slave devices 130, and where those positions are relative to the slave device 130 generating the device view 210.

As discussed above, the master device 120 may be in communication with one or more slave devices 130. The master device 120 may detect a position of each of the one or more slave devices 130. Each position may be approximate. For example, and not by way of limitation, it is known in the art how to determine a position of a device 110 through tracking by way of Bluetooth, WiFi, infrared, and other technologies, and one or more known techniques may be used to determine positions of the slave devices 130. In some embodiments of the invention, the master device 120 need not be able to directly detect or determine the position of each slave device 130 involved in the session. In this case, for example, an ad hoc network may be established among the slave devices 130, such that one or more slave devices 130 may report to the master device 120 regarding the position of another slave device 130 whose position is not directly detectable by the master device 120. Thus, the positions of the various slave devices 130 may be detected, either directly or indirectly, by the master device 120.

The device view 210 may illustrate an arrangement of the slave devices 130, based on the positions of the slave devices 130, relative to one another. In some embodiments of the invention, the device view 210 illustrates the positions of the slave devices 130 relative to the master device 120 as well. Further, the master device 120 may detect the type (e.g., smartphone, tablet, notebook computer, desktop computer, network printer) of each slave device 130, and the device view 210 may associate the respective type with each representation of each slave device 130 in the device view 210. In some embodiments of the invention, the specific representation used for a slave device 130 in the device view 210 may be an icon representative of the type of the slave device 130. Thus, the user of the master device 120 can easily associate a device representation on the master display 125 with a real-life slave device 130, especially if the user is in the same room with the slave devices 130 and can thus easily compare the device view 210 to the slave devices 130 visible to the user in real life.

The user can interact with the master display 125 to make one or more connectivity requests to the connection system 100. Each connectivity request may apply to two or more devices 110 and may include, for example, at least one of a connection request, a disconnection request, a change request, and a connection rule. The devices 110 to which a connectivity request applies may be the master device 120 and a slave device 130, two slave devices 130, two master devices 120, or more than two devices 110. For instance, a connection request may request that a first device 110 connect to a second device 110, and a disconnection request may request that a first device 110 disconnect from a second device 110. Further, a connection request may indicate a direction in which data can flow during the connection, and in that case, when implemented, the connection may be made such that data is only able to flow in the indicated direction. A change request may be a request to modify a present connection, such as by qualifying the connection by indicating an applicable condition to the connection, connection type (e.g., Bluetooth, WiFi, infrared, LiFi), data transfer protocol, data transfer port, or bandwidth, for example. A connection rule may be a combination of at least one connection request, disconnection request, change request, or a combination, along with one or more conditions. A condition is a guideline or criteria for a connection, disconnection, or change. Conditions may include absolute or relative times at which connections or disconnections should occur, durations during which connections or disconnections should continue or indications of other activities that prompt connections or disconnections. For instance, a condition may be event-based, such that the occurrence of an event meets the condition.

For example, and not by way of limitation, a connection rule may ask that a first slave device 130 connect to a second slave device 130 until completion of a video playing on the first slave device 130. The connection rule may be applicable, for instance, if the second slave device 130 is a notebook computer in communication with a projector. By connecting the first slave device 130, which may be a smartphone, to the notebook computer, the video on the first slave device 130 is able to be projected to everyone in the room. When the video ends, the connection also ends, according to this connection rule.

Figure 3:
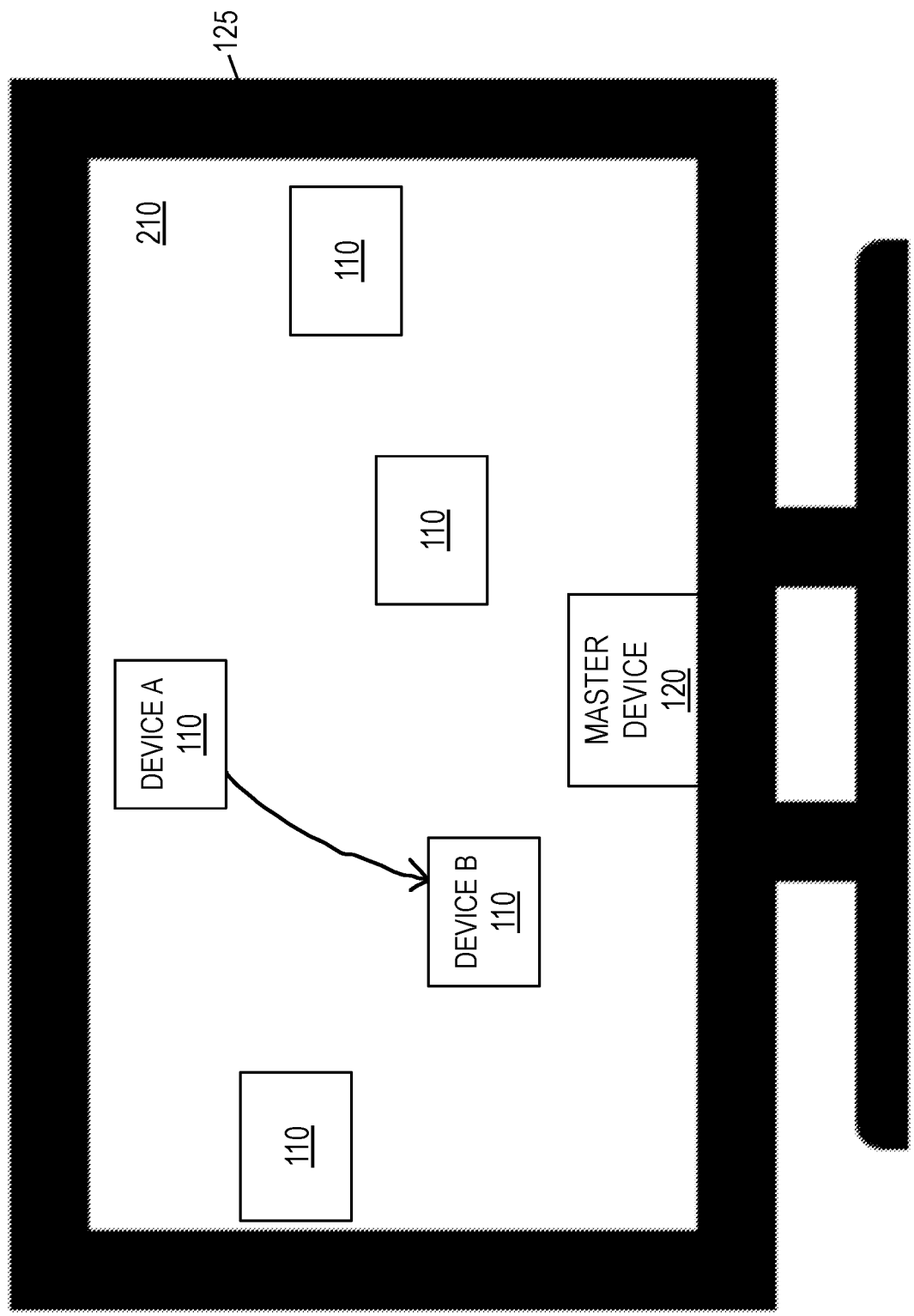
FIG. 3 illustrates a connectivity request made on the device view, according to some embodiments of the invention.
Figure 4A:
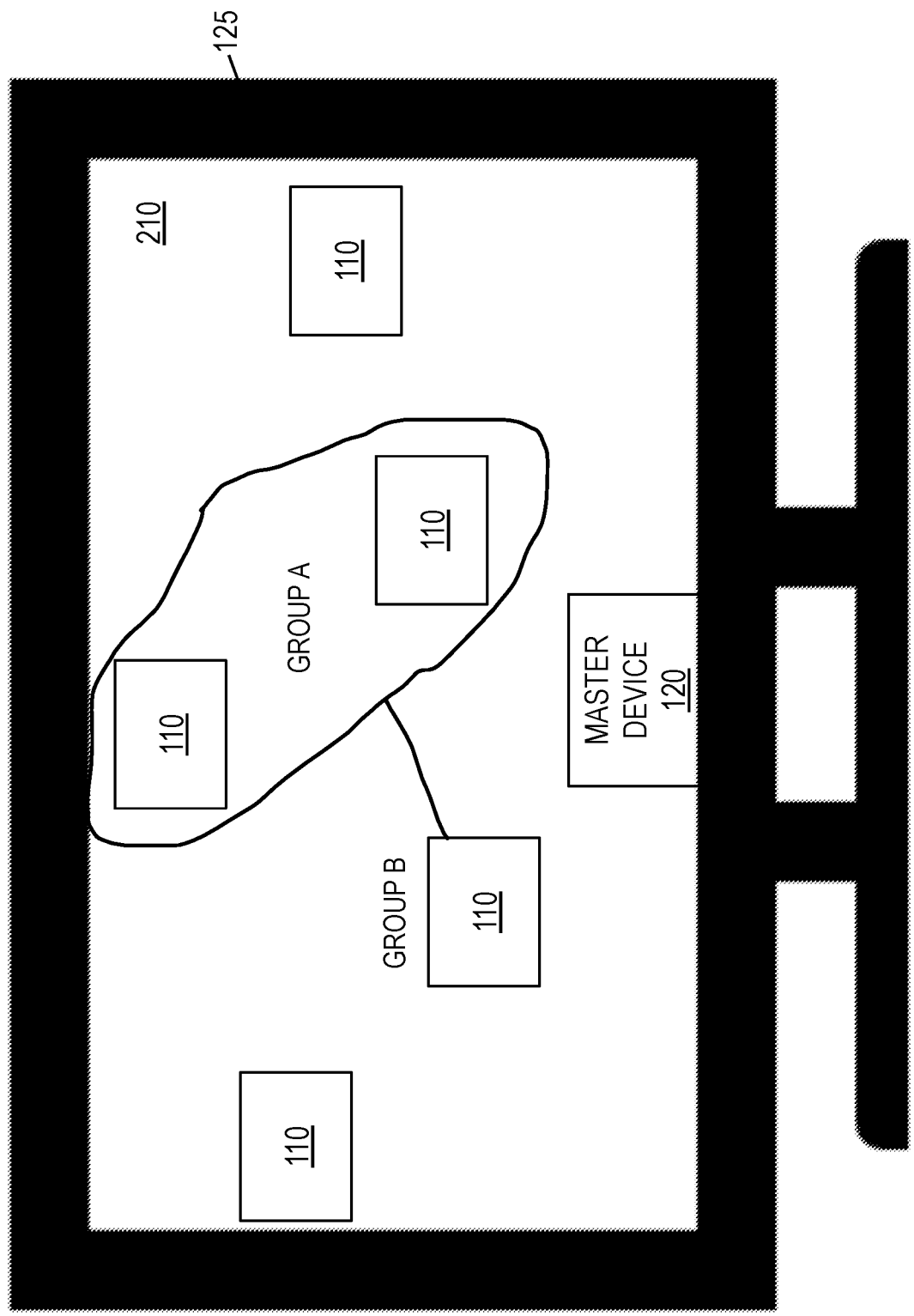
FIGS. 4A-4B illustrate equivalent connectivity requests made on the device view, according to some embodiments of the invention.
Figure 4B:
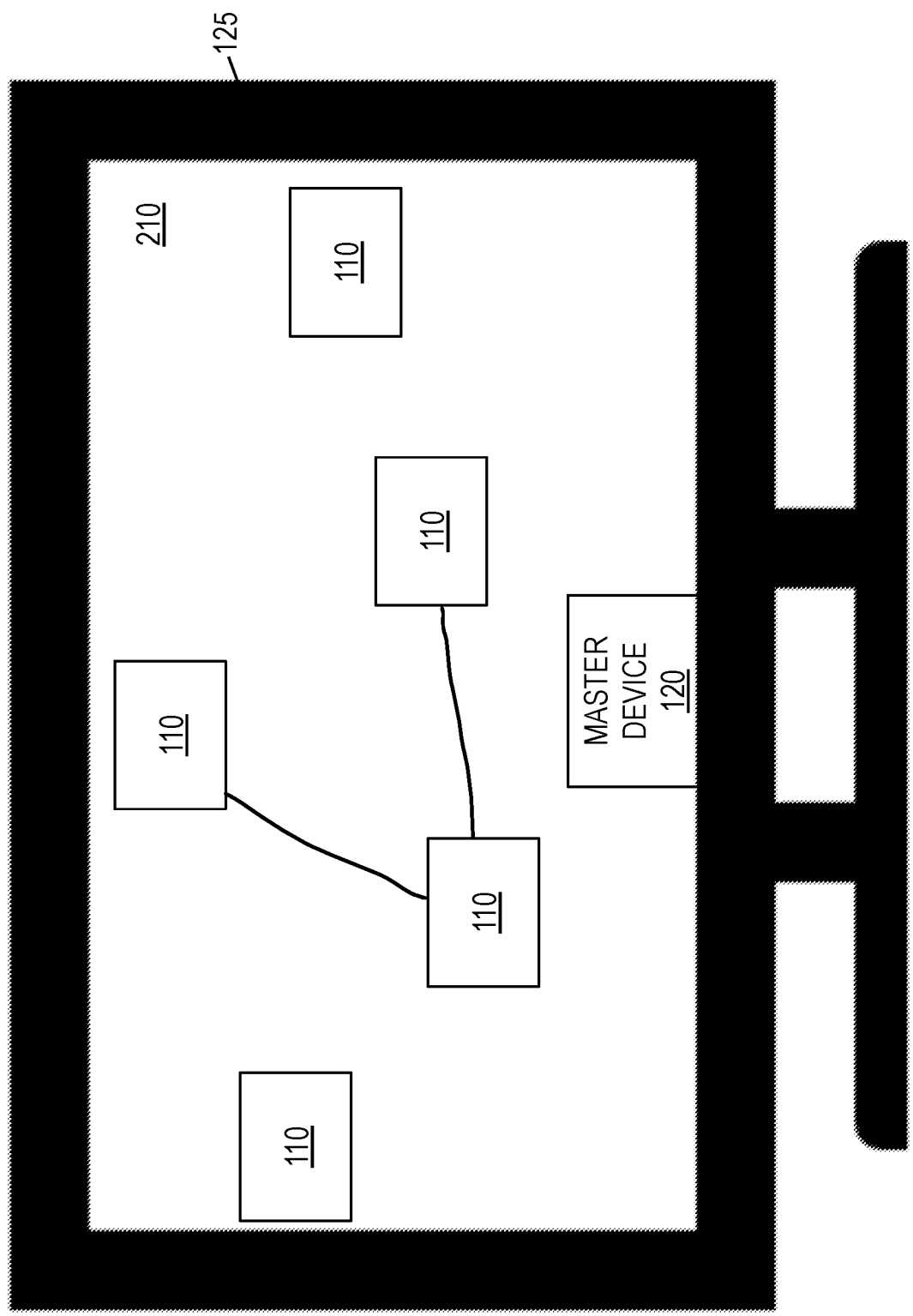

In some embodiments of the invention, a connectivity request may be made graphically, through interaction by the user with the device view 210 on the master display 125. For instance, FIG. 3 and FIGS. 4A-4B illustrate connectivity requests made on the device view 210, according to some embodiments of the invention. It will be understood that various notations may be used to indicate various connectivity requests, and it will be further understood that the graphical annotations described below are provided for illustrative purposes only.

The connection system 100 may interpret graphical annotations as connectivity requests. Such graphical annotations may include, for instance, lines, outlines, other shapes, handwriting, or a combination of these, made on the device view 210. For instance, a line drawn between a representation of a first device 110 and a representation of the second device 110 in the device view 210 may be interpreted as a connection request to connect the first device to the second device 110. If the line is an arrow, then the direction of the arrow may indicate the direction in which data flow is allowed according to the connection request. For example, FIG. 3 illustrates a connection request for a connection between Device A and Device B, with data only flowing from Device A to Device B.

An outline, or contour, that is drawn around two or more devices 110 may be interpreted as forming a group that includes the two or more devices 110. Additionally, each individual device 110, regardless of whether an outline is drawn around it, may be interpreted as a group of one device 110. A line drawn between a first group and a second group may be interpreted as a one or more connection requests, specifically including a connection request for each device 110 in the first group to connect individually to each device 110 in the second group. As mentioned above, once again, an arrow may be interpreted as a direction of data flow for each of such connections. For example, FIG. 4A illustrates a connection request for a connection between Group A and Group B, with Group B being a single device 110, and with data allowed to flow in both directions. FIG. 4B illustrates a set of connection requests that are equivalent to the connection request in FIG. 4A. A shown by comparing FIG. 4A and FIG. 4B, in some embodiments of the invention, the connection request between Group A and Group B is equivalent to a connection request between each device 110 in Group A and the device 110 in Group B.

The connection system 100 may have a set of established commands, which can be indicated by words, phrases, symbols, or contextual diagrams. For example, and not by way of limitation, a slash drawn through an existing line may be a symbol to be interpreted as a disconnection request, to end the connection represented by the line. For another example, a short upward arrow near a line may indicate that an increase in bandwidth is requested for the connection associated with the line.

As mentioned above, a graphical annotation made to indicate a connectivity request may include handwriting. It is well-known in the art how to convert handwriting into characters, and a known method may be used in the connection system 100. Handwriting may be used to qualify a connection, such as by indicating a condition, connection type (e.g., Bluetooth, WiFi, infrared, LiFi), data transfer protocol, data transfer port, or bandwidth of a connection. For instance, to indicate a connection rule, handwriting of text or symbols may be used to describe or otherwise indicate a condition of one or more connections, disconnections, or changes that are indicated by other markings. When a user makes one or more marks on the device view 210, where these marks include handwriting, the master device 120, such as by way of the connection application 115, may determine that the handwriting accompanies other marks, based proximity in time or proximity in space, or both, of the handwriting to the other marks. Together, the handwriting and the other marks may be considered a single graphical annotation, or a set of graphical annotations to be interpreted as a single connectivity request. For example, when a graphical annotation includes a line or other marking that indicate a connection or disconnection, and when the graphical annotation further includes handwriting describing a condition, then the graphical annotation may be interpreted as a connection rule, in which the connection or disconnection is conditional.

Handwriting on the device view 210 may be written in natural language, in which case the connection system 100 may utilize natural language processing to interpret the natural language. For example, and not by way of limitation, a user may draw a line on a device view 210 of the master display 125, where the line extends between a first slave device 130 and a second slave device 130. Near that line, the user may write "10 minutes." The master device 120, such as by way of the connection application 115, may determine that this text applies to the line due to proximity in time or proximity in space on the device view 210, or both. Thus, the master device 120 may interpret this combined graphical annotation as a connection rule, which asks for the first slave device 130 and the second slave device 130 to connect and to remain connected for ten minutes.

A user of a slave device 130 may make a connectivity request in the manner described above, using a device view 210 on a display of the slave device 130. In that case, the connectivity request may be transmitted to the master device 120 for approval. The connectivity request may be displayed graphically in a device view 210 on the master display 125, and the user of the master device 120 may indicate approval or disapproval of the connectivity request. If the connectivity request is approved by the user of the master device 120, then the connectivity request may be implemented as if made at the master device 120.

FIG. 5 is a flow diagram of a method for controlling device-to-device connections, according to some embodiments of the invention. At block 505, a session of the connection system 100 may begin. As discussed above, a session may begin by a user initiating a session through the connection application 115. The master device 120 and each slave device 130 may enter the session, thus providing the master device 120 access to the slave devices 130.

At block 510, the master display 125 may display the various slave devices 130 in a device view 210. As discussed above, the master device 120 may detect the position of each slave device 130 and may represent each slave device 130 and its respective position in the device view 210.

At decision block 515, it may be determined whether an authorized user is operating the master device 120. It will be understood by one skilled in the art that, in some cases, mere access to the master device 120 or to the connection application 115 on the master device 120 may be sufficient authentication of a user, and thus authorization of the user may be skipped in some embodiments of the invention. Alternatively, however, a stylus 140 may be used with a biometric reader 145, such as a fingerprint scanner. Upon reading the user's biometric information (e.g., scanning the user's finger) and verifying that the user's biomatric information matches saved biometric data associated with an authorized user, the user may be authorized.

In some embodiments of the invention, if authorization is required through the stylus 140, such as through the biometric reader of the stylus 140, then the stylus 140 may occasionally re-validate the user to ensure that an authorized user is still in control. This may occur throughout the session of the connection system 100. For example, if the biometric reader 145 is a fingerprint scanner, then each time the user removes his or detected finger from the fingerprint scanner, the stylus 140 may re-validate the user to ensure authorization upon return of the user's finger to the fingerprint scanner. For another example, each time a graphical annotation is received by way of the stylus 140, the biometric reader 145 may be used to re-validate the user before the connectivity request represented by the graphical annotation is implemented.

If authorization fails, then the method 500 may repeat to block 515 at each authorization attempt until an authorized user is identified. For instance, each time a finger is detected at the stylus 140, the finger may be scanned, and the resulting biometric data may be compared to known authorized users. Alternatively, if the user is deemed authorized, then the method 500 may proceed to block 520.

At block 520, the master device 120 may receive a graphical annotation on the device view 210 shown on the master display 125. For example, the master device 120 may detect that a user is drawing, or has drawn, on the device view 210, and that drawing may be in the form of a graphical annotation. If the stylus 140 is being used, then the graphical annotation may be received as stylus input at the master display 125, specifically through the drawing of the stylus 140 on the device view 210. The mechanism of receipt of the graphical annotation when the stylus 140 is used may depend on the technology of the stylus. For example, and not by way of limitation, the stylus may communicate the graphical annotation to the master device based on detecting its changing positions on the master display 125, or alternatively, the master display 125 may detect the changing positions of the stylus and communicate the resulting graphical annotation to the master device 120. Alternatively, however, a finger, mouse, or another implement may be used to make the graphical annotation on the device view 210.

At block 525, the graphical annotation may be interpreted as a connectivity request. As discussed above, the language of graphical annotations may vary from one embodiment to another. However, the connection system 100 may know the language being used and may thus be enabled to interpret the graphical annotation. Specifically, the connection application 115 at the master device 120 may receive the graphical annotation, which may be provided in image format, and may perform image analysis to translate the graphical annotation into a connectivity request.

In some cases, the connectivity request may be received at a slave device 130. In some embodiments of the invention, a slave device 130 can display a device view 210 to its user, and the slave device 130 is enabled to receive connectivity requests, such as by way of a touchscreen display of the slave device 130. A user may thus draw a graphical annotation on a local touchscreen display of the slave device 130, where the graphical annotation represents a connectivity request. This connectivity request may then be transmitted to the master device 120, either in the form of the graphical annotation or in some other format readable by the master device 120. The master device 120 may display the connectivity request from the slave device 130 and may await approval from a user at the master device 120. For example, and not by way of limitation, the connectivity request may be shown in the device view 210 of the master display 125 and may include the applicable graphical annotation. After approval is received at the master device 120, the connection system 100 may handle the connectivity request as if it came from the master device 120.

At block 530, the connection system 100 may implement the connectivity request. Generally, the master device 120 may instruct each slave device 130 to which the connectivity request applies to perform the tasks indicated in the connectivity request, and the slave devices 130 may in turn comply. As mentioned above, the slave devices 130 may form an ad hoc network, and thus the master device 120 may provide such instruction directly or indirectly. For instance, if a master device 120 is unable to directly communicate with a first slave device 130, then the master device 120 may instruct one or more of the other slave devices 130 to communicate an instruction to the first slave device 130 on behalf of the master device 120. In some cases, the master device 120 need not instruct every device 110 to which a connectivity request applies, as in some cases, it may be sufficient to instruct only one slave device 130 of a connectivity request between two slave devices 130 and then to rely on that one slave device 130 to make the appropriate connection or disconnection with the other slave device 130. If a connectivity request applies to the master device 120, then the master device 120 may comply with the connectivity request by making the requested one or more connections, disconnections, or changes.

If the connectivity request includes a connection rule, then the master device 120 may transmit the rule to each slave device 130, or to at least one slave device 130, to which the rule applies. The master device 120 may then rely on each slave device 130 in question to make one or more connections or disconnections, or both, in accordance with the connection rule. For instance, if the connectivity request requires a first slave device 130 and a second slave device 130 to connect to each other for ten minutes, then this rule applies to both the first slave device and the second slave device 130. Thus, the master device 120 may transmit the rule to the first slave device 130 or the second slave device 130, or both. The first slave device 130 and the second slave device 130 may then make one or more connections or disconnections, or both, in accordance with the connection rule.

Alternatively, the master device 120 may monitor for the one or more conditions of the rule and may instruct one or more of the applicable slave devices 130 to connect or to disconnect according to the connection rule. For instance, given the previous example of a first slave device 130 connecting to a second slave device 130 until completion of a video playing on the first slave device 130, the master device 120 may initially instruct the first slave device 130 to connect to the second slave device 130, the second slave device 130 to connect to the first slave device 130, or each of the first and second slave devices 130 to connect to each other. After the video completes playing on the first slave device 130, the master device 120 may instruct the first slave device 130 to disconnect from the second slave device 130, the second slave device 130 to disconnect from the first slave device 130, or each of the first and second slave devices 130 to disconnect from each other.

It will be understood that the connection system 100 may continue controlling connections between the various devices 110 as long as the session continues. For instance, after block 530, the method 500 may return to block 520 to receive a new connectivity request in the form of a graphical annotation. In some embodiments of the invention, the connection system 100, such as by way of the connection application 115, clears each graphical annotation from the device view 210 after the corresponding connectivity request has been implemented, or completed. Thus, a user may make further connectivity requests using an unmarked device view 210, or using a device view 210 that is marked only with graphical annotations representing ongoing connections. However, at some point, the user at the master device 120 may end the session, such as by indicating a desire to end it at the connection application 115. Further, a slave device 130 may leave a session before the session ends, thus disabling control of connections that involve that slave device 130. This may occur, for instance, when the connection application 115 at the slave device 130 receives an indication to quit.

Figure 6:
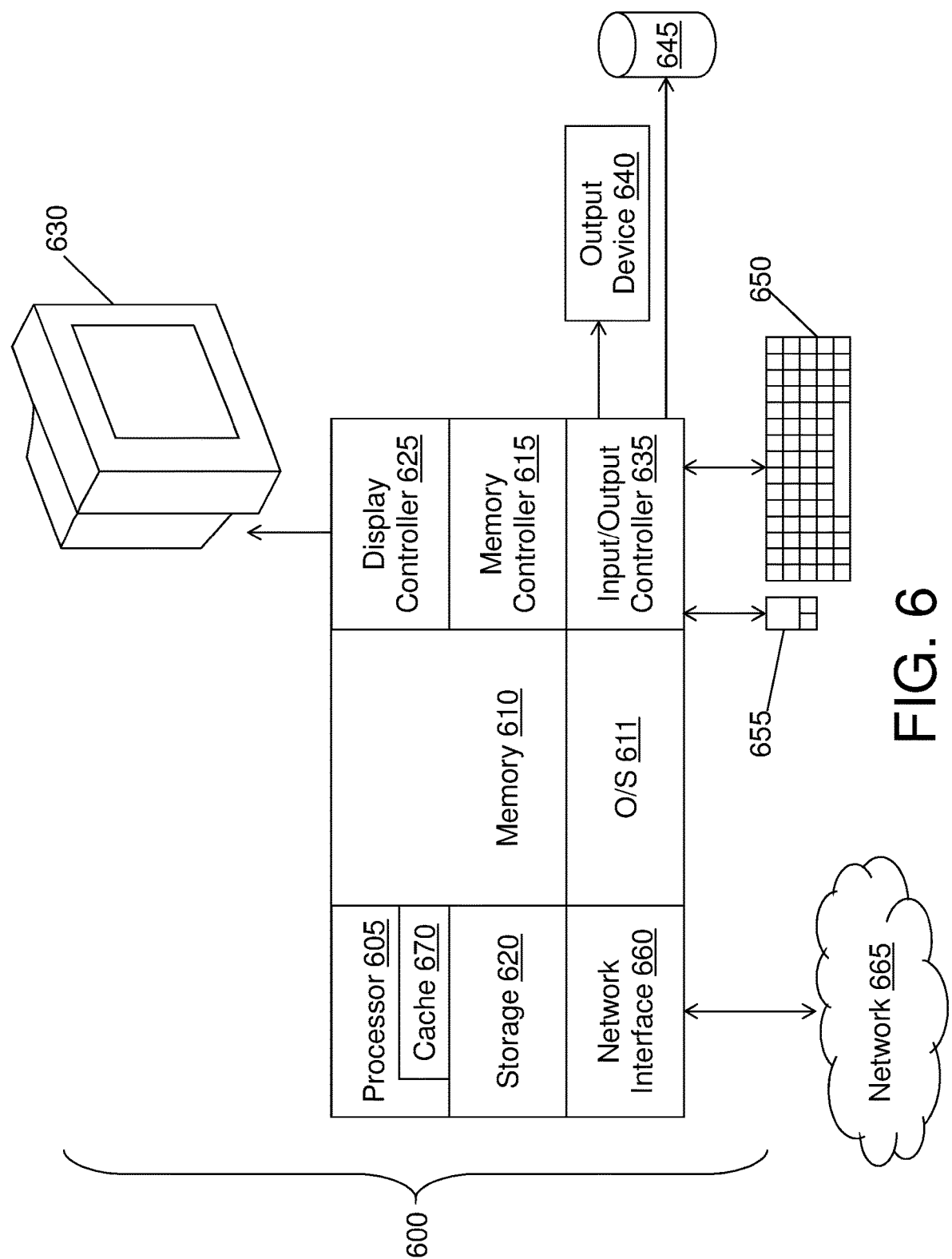
FIG. 6 is a block diagram of a computer system for implementing some or all aspects of the connection system, according to some embodiments of this invention.

FIG. 6 is a block diagram of a computer system 600 for implementing some or all aspects of the system, according to some embodiments of this invention. The connection systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or another device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the connection systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Connection systems 100 and methods according to this disclosure may be embodied, in whole or in part, in computer program products or in computer systems 600, such as that illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
   detecting a respective position of each device of a plurality of devices;
   generating a device view indicating the respective position of each device of the plurality of devices;
   receiving a graphical annotation on the device view, wherein the graphical annotation applies to at least two devices of the plurality of devices;
   interpreting the graphical annotation as a connectivity request applicable to the at least two devices; and
   implementing the connectivity request by establishing communication between the at least two devices, responsive to the graphical annotation on the device view, wherein:
   the at least two devices comprise a first group of one or more devices and a second group of at least two devices;
   the graphical annotation comprises an outline around the second group of at least two devices;
   the graphical annotation further comprises a line connecting the first group of one or more devices to the outline around the second group of at least two devices; and
   the interpreting the graphical annotation as a connectivity request comprises interpreting the line as a request to establish communication between each device in the first group of one or more devices to each device in the second group of at least two devices.

2. The computer-implemented method of claim 1, wherein the device view comprises a plurality of shapes, each shape representing a respective device of the plurality of devices, and each shape positioned corresponding to a position of the respective device in real space.

3. The computer-implemented method of claim 1, further comprising:
   receiving stylus input made by a stylus;
   wherein the stylus input comprises a second graphical annotation on the device view, and wherein the second graphical annotation represents a second connectivity request;
   detecting biometric information of a user of the stylus;
   comparing the biometric information to known biometric data representing a set of one or more authorized users; and
   rejecting the second connectivity request, based on the biometric information failing to match the known biometric data.

4. The computer-implemented method of claim 1, wherein:
   the at least two devices comprise a first device and a second device;
   the graphical annotation comprises a line connecting the first device to the second device in the device view;
   the interpreting the graphical annotation as a connectivity request comprises interpreting the line as a request to connect the first device to the second device; and
   the implementing the connectivity request comprises instructing at least one of the first device and the second device to form a connection between the first device and the second device.

5. The computer-implemented method of claim 4, wherein the line in the graphical annotation comprises an arrow, and wherein the interpreting the graphical annotation as a connectivity request comprises interpreting a direction of the arrow as a direction of data flow in the connectivity request.

6. The computer-implemented method of claim 1, wherein the graphical annotation comprises handwriting, and wherein the interpreting the graphical annotation as a connectivity request comprises interpreting the handwriting as a qualification of the connectivity request.

7. A system comprising:
   a memory having computer-readable instructions; and
   one or more processors for executing the computer-readable instructions, the computer-readable instructions comprising:
   detecting a respective position of each device of a plurality of devices;
   generating a device view indicating the respective position of each device of the plurality of devices;
   receiving a graphical annotation on the device view, wherein the graphical annotation applies to at least two devices of the plurality of devices;
   interpreting the graphical annotation as a connectivity request applicable to the at least two devices; and
   implementing the connectivity request by establishing communication between the at least two devices, responsive to the graphical annotation on the device view, wherein:
   the at least two devices comprise a first group of one or more devices and a second group of at least two devices;
   the graphical annotation comprises an outline around the second group of at least two devices;
   the graphical annotation further comprises a line connecting the first group of one or more devices to the outline around the second group of at least two devices; and
   the interpreting the graphical annotation as a connectivity request comprises interpreting the line as a request to establish communication between each device in the first group of one or more devices to each device in the second group of at least two devices.

8. The system of claim 7, wherein the device view comprises a plurality of shapes, each shape representing a respective device of the plurality of devices, and each shape positioned corresponding to a position of the respective device in real space.

9. The system of claim 7, the computer-readable instructions further comprising:
   receiving stylus input made by a stylus;
   wherein the stylus input comprises a second graphical annotation on the device view, and wherein the second graphical annotation represents a second connectivity request;
   detecting biometric information of a user of the stylus;

comparing the biometric information to known biometric data representing a set of one or more authorized users; and rejecting the second connectivity request, based on the biometric information failing to match the known biometric data.

10. The system of claim 7, wherein:

the at least two devices comprise a first device and a second device;

the graphical annotation comprises a line connecting the first device to the second device in the device view;

the interpreting the graphical annotation as a connectivity request comprises interpreting the line as a request to connect the first device to the second device; and the implementing the connectivity request comprises instructing at least one of the first device and the second device to form a connection between the first device and the second device.

11. The system of claim 10, wherein the line in the graphical annotation comprises an arrow, and wherein the interpreting the graphical annotation as a connectivity request comprises interpreting a direction of the arrow as a direction of data flow in the connectivity request.

12. The system of claim 7, wherein the graphical annotation comprises handwriting, and wherein the interpreting the graphical annotation as a connectivity request comprises interpreting the handwriting as a qualification of the connectivity request.

13. A computer-program product for connecting devices, the computer-program product comprising a computer-readable storage medium having program instructions embodied therewith, the program instructions executable by a processor to cause the processor to perform a method comprising:

detecting a respective position of each device of a plurality of devices;

generating a device view indicating the respective position of each device of the plurality of devices;

receiving a graphical annotation on the device view, wherein the graphical annotation applies to at least two devices of the plurality of devices;

interpreting the graphical annotation as a connectivity request applicable to the at least two devices; and implementing the connectivity request by establishing communication between the at least two devices, responsive to the graphical annotation on the device view, wherein:

the at least two devices comprise a first group of one or more devices and a second group of at least two devices;

the graphical annotation comprises an outline around the second group of at least two devices;

the graphical annotation further comprises a line connecting the first group of one or more devices to the outline around the second group of at least two devices; and the interpreting the graphical annotation as a connectivity request comprises interpreting the line as a request to establish communication between each device in the first group of one or more devices to each device in the second group of at least two devices.

14. The computer-program product of claim 13, wherein the device view comprises a plurality of shapes, each shape representing a respective device of the plurality of devices, and each shape positioned corresponding to a position of the respective device in real space.

15. The computer-program product of claim 13, the method further comprising:

receiving stylus input made by a stylus;

wherein the stylus input comprises a second graphical annotation on the device view, and wherein the second graphical annotation represents a second connectivity request;

detecting biometric information of a user of the stylus;

comparing the biometric information to known biometric data representing a set of one or more authorized users; and rejecting the second connectivity request, based on the biometric information failing to match the known biometric data.

16. The computer-program product of claim 13, wherein:

the at least two devices comprise a first device and a second device;

the graphical annotation comprises a line connecting the first device to the second device in the device view;

the interpreting the graphical annotation as a connectivity request comprises interpreting the line as a request to connect the first device to the second device; and the implementing the connectivity request comprises instructing at least one of the first device and the second device to form a connection between the first device and the second device.

17. The computer-program product of claim 16, wherein the line in the graphical annotation comprises an arrow, and wherein the interpreting the graphical annotation as a connectivity request comprises interpreting a direction of the arrow as a direction of data flow in the connectivity request.

18. The computer-program product of claim 13, wherein the graphical annotation comprises handwriting, and wherein the interpreting the graphical annotation as a connectivity request comprises interpreting the handwriting as a qualification of the connectivity request.

* * * * *